US010033842B2

(12) United States Patent
Li (10) Patent No.: US 10,033,842 B2
(45) Date of Patent: Jul. 24, 2018

(54) GRE MESSAGE ENCAPSULATION METHOD, DECAPSULATION METHOD, AND CORRESPONDING DEVICES

(71) Applicant: ZTE Corporation, Shenzhen, Guangdong (CN)

(72) Inventor: Ying Li, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 153 days.

(21) Appl. No.: 14/905,894

(22) PCT Filed: Jun. 23, 2014

(86) PCT No.: PCT/CN2014/080535
§ 371 (c)(1),
(2) Date: Jan. 18, 2016

(87) PCT Pub. No.: WO2015/010512
PCT Pub. Date: Jan. 29, 2015

(65) Prior Publication Data
US 2016/0156752 A1 Jun. 2, 2016

(30) Foreign Application Priority Data

Jul. 23, 2013 (CN) .......................... 2013 1 0312219

(51) Int. Cl.
*H04L 12/28* (2006.01)
*H04L 29/08* (2006.01)
*H04L 12/46* (2006.01)

(52) U.S. Cl.
CPC ........ *H04L 69/324* (2013.01); *H04L 12/4633* (2013.01)

(58) Field of Classification Search
CPC .... H04L 69/22; H04L 69/324; H04L 12/4633
See application file for complete search history.

(56) References Cited

U.S. PATENT DOCUMENTS

2006/0171406 A1  8/2006  Kwon
2006/0215657 A1  9/2006  Lee
(Continued)

FOREIGN PATENT DOCUMENTS

CN       1942000 A     4/2007
CN     101848171 A     9/2010
(Continued)

OTHER PUBLICATIONS

Hanks, Stan, et al. "RFC 1701: Generic routing encapsulation (GRE)." (1994).*
(Continued)

*Primary Examiner* — Charles C Jiang
*Assistant Examiner* — Ryan Kavleski
(74) *Attorney, Agent, or Firm* — Oppedahl Patent Law Firm LLC (57) ABSTRACT

Methods and devices for Generic Routing Encapsulation (GRE) message encapsulation and decapsulation are provided. The encapsulation method includes: performing attribute setting on predetermined bits of a GRE message header according to a preset encapsulation rule during GRE message encapsulation of an original message; and performing GRE message encapsulation on the attribute-set GRE message header and the original message. The decapsulation method includes: performing decapsulation analysis on predetermined bits of a header of a GRE message according to a preset decapsulation rule when the GRE message is received; and performing decapsulation on the received GRE message to obtain an original message in the received GRE message according to an analysis result. Correspondingly, the encapsulation device includes a setting module and an encapsulation module; and the decapsulation device includes an analysis module and a decapsulation module.

6 Claims, 4 Drawing Sheets

(56) References Cited

U.S. PATENT DOCUMENTS

| | | | |
|---|---|---|---|
| 2009/0122734 A1* | 5/2009 | Kim .................. | H04W 28/06 |
| | | | 370/310 |
| 2011/0274108 A1* | 11/2011 | Fan .................. | H04L 12/4633 |
| | | | 370/390 |
| 2012/0099602 A1 | 4/2012 | Nagapudi | |
| 2012/0287933 A1 | 11/2012 | Li | |
| 2014/0254358 A1* | 9/2014 | Li .................. | H04L 45/306 |
| | | | 370/229 |

FOREIGN PATENT DOCUMENTS

| | | |
|---|---|---|
| CN | 102164090 A | 8/2011 |
| EP | 1686729 A1 | 8/2006 |

OTHER PUBLICATIONS

Farinacci, Dino, et al. "RFC 2784: Generic routing encapsulation (GRE)." (2000).*

International Search Report in international application No. PCT/CN2014/080535, dated Sep. 26, 2014.

English Translation of the Written Opinion of the International Search Authority in international application No. PCT/CN2014/080535, dated Sep. 26, 2014.

Supplementary European Search Report in European application No. 14829826.8, dated Jun. 29, 2016.

* cited by examiner

GRE MESSAGE ENCAPSULATION METHOD, DECAPSULATION METHOD, AND CORRESPONDING DEVICES

TECHNICAL FIELD

The present disclosure relates to the field of network technologies, and in particular to a GRE message encapsulation method and decapsulation method, as well as corresponding devices.

BACKGROUND

Generic Routing Encapsulation (GRE) is an encapsulation protocol which provides a mechanism for encapsulating a message of a protocol into a message following another protocol to realize transmission of the message in a heterogeneous network. In 1994, GRE was submitted to the Internet Engineering Task Force (IETF) by Cisco and Net Smiths, with labels of RFC1701 and RFC1702. In 2000, GRE was revised by Cisco, etc., and is named as GRE V2 with a label of RFC2784. At present, although RFC1701 is not a main standard to be followed, there still exists RFC1701-based equipment in an existing network.

At a message sender, a GRE tunnel encapsulates an original message and a GRE message header into a GRE message for "packaging" with a protocol message, and places the GRE message in a "data area" of an Internet Protocol (IP) message for transmission. After receiving the GRE message, a receiver performs decapsulation on the GRE message to recover the original message according to the format of the GRE message header. When the GRE message header is analyzed, there is no explicit field for identifying a length of the whole GRE message header in the GRE message header. If the message sender adopts RFC2784-based routing equipment, the length of the GRE message header may be 32 to 64 bits, and if the message receiver adopts RFC1701-based routing equipment, the length of the GRE message header may be 32 to 160 bits. The format and bit length of the GRE message header may not be unified, so that a corresponding field may not be correctly identified to analyze the complete message header, and routers may not be interconnected. Therefore, how to solve the problem has become an urgent technical problem.

SUMMARY

The present disclosure is mainly intended to provide methods and devices for GRE message encapsulation and decapsulation, so as to solve the problem that routers may not be interconnected due to inconsistency of formats of GRE message headers.

A method for GRE message encapsulation is provided, which may include: performing attribute setting on predetermined bits of a GRE message header according to a preset encapsulation rule during GRE message encapsulation of an original message; and performing GRE message encapsulation on the attribute-set GRE message header and the original message.

Preferably, the predetermined bits may include first to sixteenth bits of the GRE message header, and the preset encapsulation rule may include: filling 0 or 1 to the first bit of the GRE message header; filling 0 to the second bit of the GRE message header; filling 0 or 1 to the third bit of the GRE message header; filling 0 or 1 to the fourth bit of the GRE message header; filling 0 to the fifth to thirteenth bits of the GRE message header; and filling 0 to the fourteenth to sixteenth bits of the GRE message header.

A method for GRE message decapsulation is provided, which may include: performing decapsulation analysis on predetermined bits of a header of a GRE message according to a preset decapsulation rule when the GRE message is received; and performing decapsulation on the received GRE message to obtain an original message in the received GRE message according to an analysis result.

Preferably, the predetermined bits may include first to sixteenth bits of the header of the GRE message, and the preset decapsulation rule includes: directly performing decapsulation when the first bit of the header of the GRE message is 0; performing checksum check when the first bit of the header of the GRE message is 1, and directly performing decapsulation when the GRE message passes the checksum check, otherwise, discarding the GRE message when the GRE message does not pass the checksum check; directly performing decapsulation when the second bit of the header of the GRE message is 0; directly performing decapsulation when the third bit of the header of the GRE message is 0; performing keyword checking when the third bit of the header of the GRE message is 1, and judging whether to directly perform decapsulation or not according to a checking result; directly performing decapsulation when the fourth bit of the header of the GRE message is 0; performing sequence number check when the fourth bit of the header of the GRE message is 1, and judging whether to directly perform decapsulation or not according to a check result; ignoring the fifth to thirteenth bits of the header of the GRE message, and directly performing decapsulation; directly performing decapsulation when the fourteenth to sixteenth bits of the header of the GRE message are 0; and discarding the GRE message when any one of the fourteenth to sixteenth bits of the header of the GRE message is not 0.

Preferably, before the step of performing decapsulation on the received GRE message to obtain the original message in the received GRE message according to the analysis result, the method may further include: acquiring offset corresponding to the predetermined bits when the decapsulation analysis is performed on the predetermined bits of the header of the GRE message; and calculating a length of the header of the GRE message according to the offset.

A device for GRE message encapsulation is provided, which may include: a setting module, configured to perform attribute setting on predetermined bits of a GRE message header according to a preset encapsulation rule during GRE message encapsulation of an original message; and an encapsulation module, configured to perform GRE message encapsulation on the attribute-set GRE message header and the original message.

Preferably, the predetermined bits may include first to sixteenth bits of the GRE message header, and the preset encapsulation rule may include: filling 0 or 1 to the first bit of the GRE message header; filling 0 to the second bit of the GRE message header; filling 0 or 1 to the third bit of the GRE message header; filling 0 or 1 to the fourth bit of the GRE message header; filling 0 to the fifth to thirteenth bits of the GRE message header; and filling 0 to the fourteenth to sixteenth bits of the GRE message header.

A device for GRE message decapsulation is provided, which may include: an analysis module, configured to perform decapsulation analysis on predetermined bits of a header of a GRE message according to a preset decapsulation rule when the GRE message is received; and a decapsulation module, configured to perform decapsulation on the received GRE message to obtain an original message in the received GRE message according to an analysis result.

Preferably, the predetermined bits may include first to sixteenth bits of the header of the GRE message, and the preset decapsulation rule may include: directly performing decapsulation when the first bit of the header of the GRE message is 0; performing checksum check when the first bit of the header of the GRE message is 1, directly performing decapsulation when the GRE message passes checksum check, and discarding the GRE message when the GRE message does not pass checksum check; directly performing decapsulation when the second bit of the header of the GRE message is 0; directly performing decapsulation when the third bit of the header of the GRE message is 0; performing keyword checking when the third bit of the header of the GRE message is 1, and judging whether to directly perform decapsulation or not according to a checking result; directly performing decapsulation when the fourth bit of the header of the GRE message is 0; performing sequence number check when the fourth bit of the header of the GRE message is 1, and judging whether to directly perform decapsulation or not according to a check result; ignoring the fifth to thirteenth bits of the header of the GRE message, and directly performing decapsulation; directly performing decapsulation when the fourteenth to sixteenth bits of the header of the GRE message are 0; and discarding the GRE message when any one of the fourteenth to sixteenth bits of the header of the GRE message is not 0.

Preferably, the analysis module may further include: an acquisition unit, configured to acquire offset corresponding to the predetermined bits when the decapsulation analysis is performed on the predetermined bits of the header of the GRE message; and a calculation unit, configured to calculate a length of the header of the GRE message according to the offset.

A computer storage medium is provided, in which computer-executable instructions are stored, the computer-executable instructions being configured to execute the above-mentioned methods.

According to the embodiments of the present disclosure, attribute setting and encapsulation are performed on a GRE message header following different protocols according to a preset encapsulation rule, and decapsulation analysis is performed on the header of a received GRE message to decapsulate the original message in the received GRE message according to the corresponding preset decapsulation rule, so that interconnection between network equipment following different protocols is ensured.

DETAILED DESCRIPTION

The technical solutions of the present disclosure are further described below with reference to the drawings and specific embodiments. It should be understood that the specific embodiments described here are only adopted to explain the present disclosure and not intended to limit the present disclosure.

Figure 1:
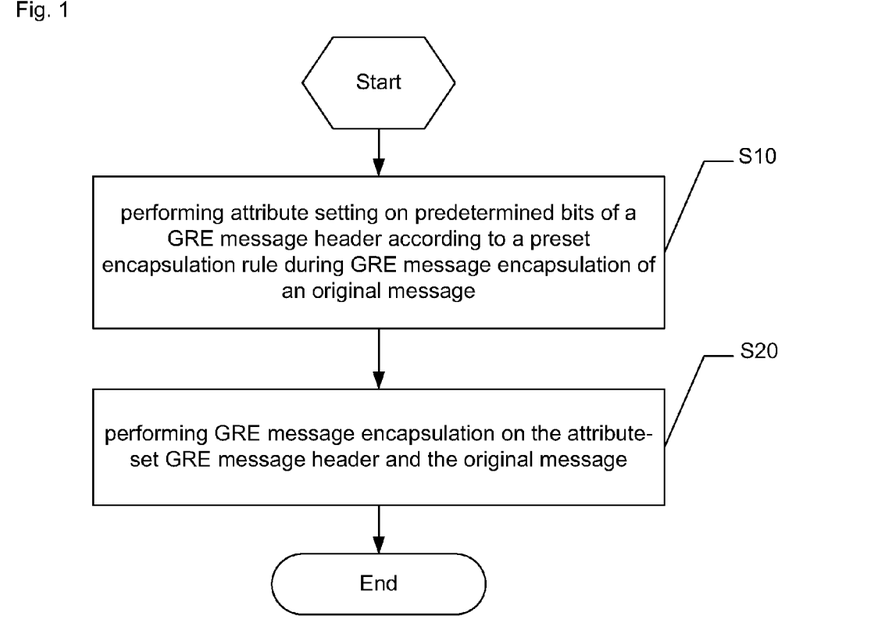
FIG. 1 is a flowchart of an embodiment of a method for GRE message encapsulation according to the present disclosure.

FIG. 1 is a flowchart of an embodiment of a method for GRE message encapsulation according to the present disclosure.

It is needed to be noted that: the flowchart in FIG. 1 is only a preferred embodiment and those skilled in the art should understand that any embodiment constructed on the basis of an idea of the present disclosure shall fall within the scope of the following technical solution:

performing attribute setting on predetermined bits of a GRE message header according to a preset encapsulation rule during GRE message encapsulation of an original message; and performing GRE message encapsulation on the attribute-set GRE message header and the original message.

A process of performing attribute setting and encapsulation on a GRE message header following different protocols is gradually implemented below with reference to the embodiment (the embodiment is described with GRE message encapsulation according to message header encapsulation rules in protocols RFC2784 and RFC2890 as an example).

Step S10: attribute setting is performed on first to sixteenth bits of a GRE message header according to a preset encapsulation rule during GRE message encapsulation of an original message.

The original message refers to a data message which is needed to be encapsulated and routed. In the embodiment, attribute setting is performed on the first to sixteenth bits in bits of the GRE message header according to the preset encapsulation rule during GRE message header encapsulation of the original message. A GRE tunnel follows a corresponding encapsulation protocol which is taken as an encapsulation standard during GRE message encapsulation, for example, some common protocols such as protocol RFC2784, protocol RFC2890 and protocol RFC1701.

Specifically, the first bit of the GRE message header is set as a checksum attribute according to protocol RFC2784, a user may select to fill 0 or 1 to an attribute value of the attribute according to own need, and when the user selects to fill 0, the checksum is invalid, that is, checksum check is not required during decapsulation; and when the user selects to fill 1, the checksum is valid, that is, checksum check is required during decapsulation. When the second bit of the GRE message header is set as a Reserved0 attribute, an attribute value is set to be 0.

Optionally, the third bit of the GRE message header is set as a Key Present attribute according to protocol RFC2890, and an attribute value of the attribute may be selectively set by the user. When the user selects to fill 0 to the attribute value of the attribute, the Key Present is invalid, that is, keyword authentication is not required during decapsulation; and when the user selects to fill 1 to the attribute value, the Key Present is valid, that is, keyword authentication is required during decapsulation, and the GRE message may be decapsulated only after the GRE message passes the keyword authentication. When the fourth bit of the GRE message header is set as a Sequence Number Present attribute, an attribute value of the attribute may also be selectively set to be 0 or 1 by the user. When the attribute value of the fourth-bit attribute is 1, sequence number check is required to be performed on the GRE message during decapsulation, and the GRE message may be decapsulated only after the GRE message passes the sequence number check; and when the attribute value of the fourth-bit attribute is 0, sequence number check is not required to be performed on the GRE message during decapsulation.

Optionally, the fifth to thirteenth bits of the GRE message header are set as a Reserved0 attribute according to protocol RFC2784, and an attribute value of the attribute is set to be 1. When the fourteenth to sixteenth bits of the GRE message header are set as a Version attribute, an attribute value of the attribute is set to be 0.

Step S20: GRE message encapsulation is performed on the attribute-set GRE message header and the original message.

In the embodiment, attribute setting is performed on the first to sixteenth bits of the GRE message header according to the preset encapsulation rule, and GRE message encapsulation is performed on the attribute-set GRE message header and the original message, during which the attribute-set GRE message header is taken as the encapsulation format of the GRE message.

According to the embodiment of the present disclosure, attribute setting and encapsulation are performed on the GRE message header following different protocols according to a preset encapsulation rule, so that interconnection between network equipment following different protocols is ensured.

Figure 2:
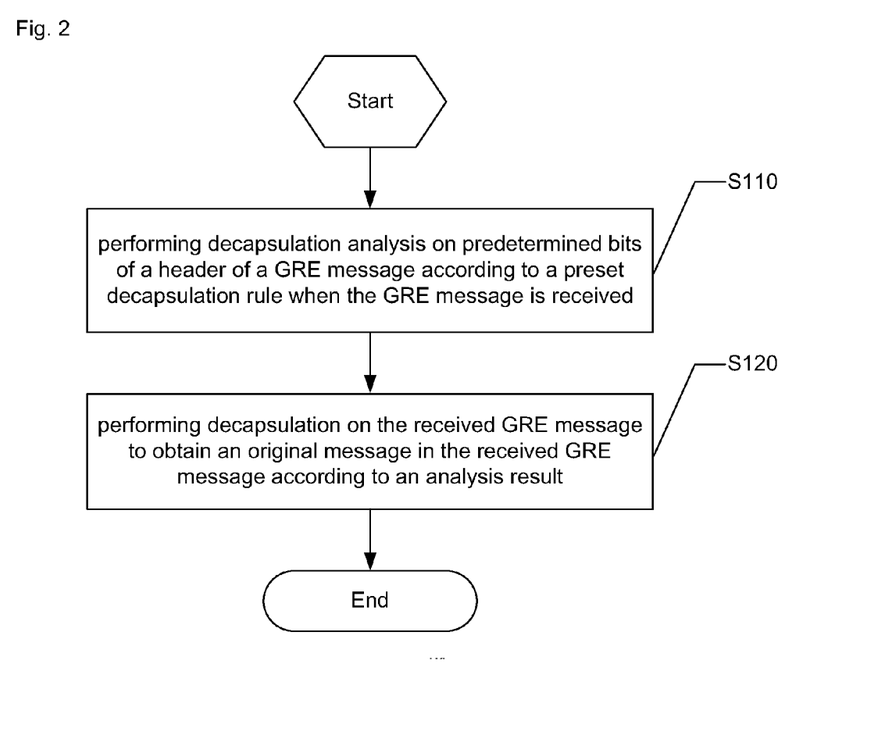
FIG. 2 is a flowchart of a first embodiment of a method for GRE message decapsulation according to the present disclosure.

FIG. 2 is a flowchart of a first embodiment of a method for GRE message decapsulation according to the present disclosure.

It is needed to be noted that: the flowchart in FIG. 2 is only a preferred embodiment and those skilled in the art should understand that any embodiment constructed on the basis of an idea of the present disclosure shall fall within the scope of the following technical solution:

performing decapsulation analysis on predetermined bits of a header of a received GRE message according to a preset decapsulation rule when the GRE message is received; and performing decapsulation on the received GRE message to obtain an original message in the received GRE message according to an analysis result.

A process of performing decapsulation analysis on the header of the GRE message to decapsulate the original message in the GRE message according to the preset corresponding decapsulation rule is gradually implemented below with reference to the embodiment.

Step S110: decapsulation analysis is performed on predetermined bits of a header of a GRE message according to a preset decapsulation rule when the GRE message is received.

The GRE message includes an original data message and the GRE message header. During analysis, decapsulation analysis is performed on first to sixteenth bits of the header of the received GRE message according to a preset decapsulation rule.

Specifically, when the first bit is analyzed, the first bit of the GRE message header is set as a checksum attribute, and when an attribute value of the attribute is 0, the GRE message is directly decapsulated; when the attribute value of the attribute is 1, a checksum is calculated for the received GRE message, the calculated checksum is compared with an original checksum in the GRE message for checksum check, and if the calculated checksum is completely consistent with the original checksum in the GRE message, it is indicated that the GRE message passes the checksum check, and the GRE message is decapsulated; otherwise if the calculated checksum is inconsistent with the original checksum in the GRE message, it is indicated that the GRE message does not pass the checksum check, and the GRE message is required to be discarded. When the second bit is analyzed, the second bit of the GRE message header is set as a Reserved0 attribute, and when an attribute value of the attribute is 0, the GRE message is directly decapsulated, wherein if an RFC2784-based router is compatible with an RFC1701-based router and the RFC1701-based router analyzes the second bit, when the attribute value of the bit is 0, the GRE message is directly decapsulated; and when the attribute value of the bit is 1, the GRE message is directly decapsulated, and meanwhile, offset generated by the bit is required to be added when a length of the GRE message header is calculated.

Optionally, when the third bit is analyzed, the third bit of the GRE message header is set as a Key Present attribute, and when an attribute value of the attribute is 0, the GRE message is directly decapsulated; and when the attribute value of the attribute is 1, keyword checking is performed, and only when keywords identified by a receiver of the router and a sender of the router are completely consistent, it is determined that the GRE message passes the checking and the GRE message is decapsulated, otherwise the GRE message is discarded. When the fourth bit of the GRE message is set as a Sequence Number Present attribute for analysis, if an attribute value of the attribute is 0, the GRE message is directly decapsulated; and when the attribute value of the attribute is 1, sequence number check is required, the GRE message is decapsulated only when the sequence numbers of the receiver of the router and the sender of the router are completely consistent, otherwise, the GRE message is discarded when the sequence number presents of the receiver of the router and the sender of the router are inconsistent. When the fifth to thirteenth bits of the GRE message header are set as a Reserved0 attribute, no matter whether an attribute value of the attribute is 0 or not 0, the fifth to thirteenth bits are ignored, and the GRE message is directly decapsulated; when the fourteenth to sixteenth bits of the GRE message header are set as a Version attribute, if an attribute value of the attribute is 0, the GRE message is directly decapsulated; and when the attribute value of any one of the fourteenth to sixteenth bits of the GRE message header is not 0, the GRE message is discarded.

Step S120: decapsulation is performed on the received GRE message to decapsulate an original message in the received GRE message according to an analysis result.

After the received GRE message header is analyzed, the received GRE message is decapsulated to obtain the original message in the received GRE message according to the analysis result. In the embodiment, the received GRE message is decapsulated according to the length of the GRE message header.

According to the embodiment of the present disclosure, decapsulation is performed on the header of a received GRE message to obtain the original message in the received GRE message according to a corresponding preset decapsulation rule, so that interconnection between network equipment following different protocols is ensured.

Figure 3:
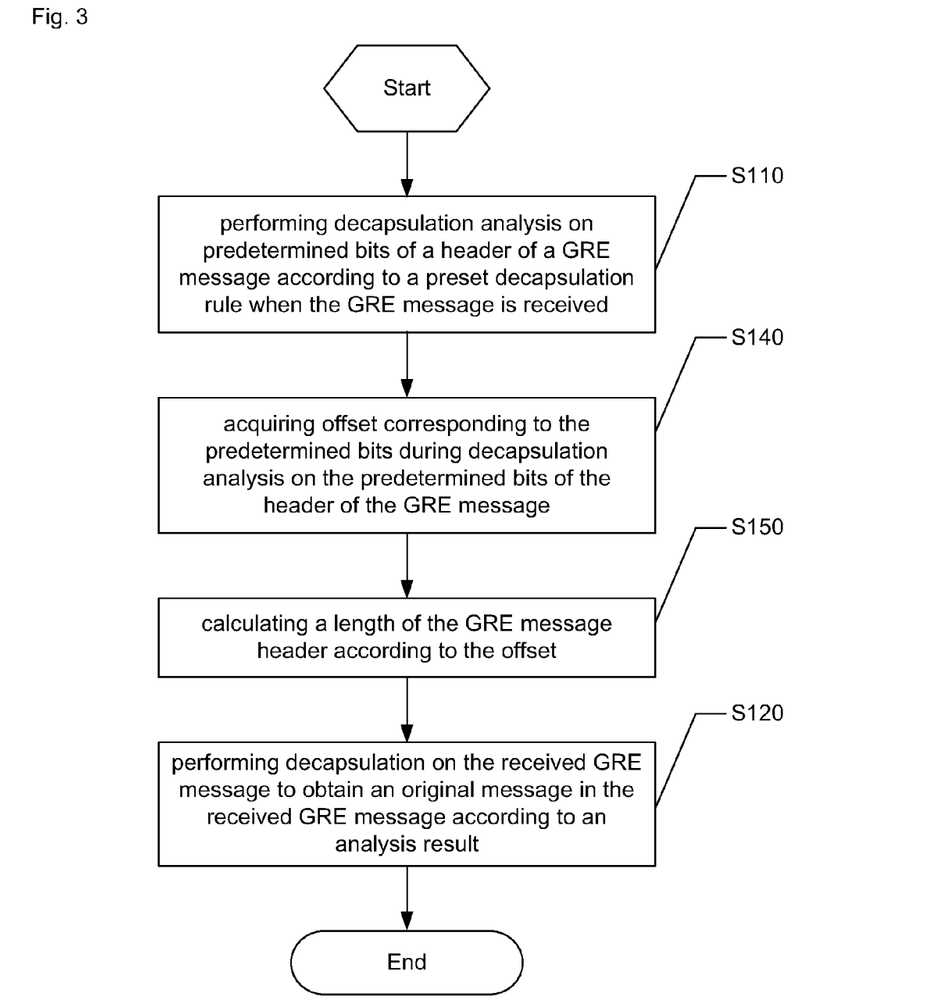
FIG. 3 is a flowchart of a second embodiment of a method for GRE message decapsulation according to the present disclosure.

FIG. 3 is a flowchart of a second embodiment of a method for GRE message decapsulation according to the present disclosure.

A second embodiment of a method for GRE message decapsulation of the present disclosure is disclosed on the basis of the abovementioned embodiment, and before Step S120 in the abovementioned embodiment, the method includes:

Step S140: offset corresponding to the predetermined bits is acquired when decapsulation analysis is performed on the predetermined bits of the header of the GRE message; and Step 150: the length of the GRE message header is calculated according to the offset.

Here, the offset refers to the bit amount of the bits in the GRE message header when the attribute values of the attributes of the bits are 1. The offset is described by taking the analysis on the first bit as an example in the embodiment. For example, when the attribute value of the first bit is 1, checksum check is required, that is, totally 32 bits in a checksum (optional) part and an offset (optional) part appear in the GRE message header, and in addition, the 32 bits are required to be added when the length of the GRE message header is calculated.

The bits of the whole GRE message header are analyzed to acquire the offset generated when the attribute value of each bit is 1, the length of the whole GRE message header is calculated according to the offset, and the original message in the received GRE message may be obtained by decapsulation more accurately according to the length of the GRE message header.

Figure 4:
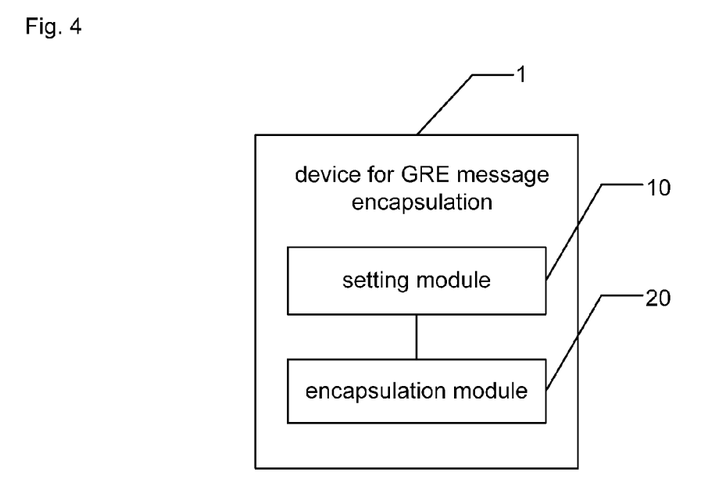
FIG. 4 is a structure diagram of a device for GRE message encapsulation embodiment according to the present disclosure.

FIG. 4 is a structure diagram of a device for GRE message encapsulation embodiment according to the present disclosure.

A device 1 for GRE message encapsulation provided by the embodiment includes:

a setting module 10, configured to perform attribute setting on first to sixteenth bits of a GRE message header according to a preset encapsulation rule during GRE message encapsulation of an original message, wherein, the original message refers to a data message which is needed to be encapsulated and routed; in the embodiment, the setting module 10 performs attribute setting on the first to sixteenth bits in bits of the GRE message header according to the preset encapsulation rule during GRE message header encapsulation of the original message; a GRE tunnel follows a corresponding encapsulation protocol which serves as an encapsulation standard during GRE message encapsulation, for example, some common protocols such as protocol RFC2784, protocol RFC2890 and protocol RFC17.

Specifically, the setting module 10 sets the first bit of the GRE message header as a Checksum attribute according to protocol RFC2784, a user may select to fill 0 or 1 to an attribute value of the attribute according to own need, and when the user selects to fill 0, the checksum is invalid, that is, checksum check is not required during decapsulation; and when the user selects to fill 1, the checksum is valid, that is, checksum check is required during decapsulation; when the setting module 10 sets the second bit of the GRE message header as a Reserved0 attribute, an attribute value is set to be 0.

Optionally, the setting module 10 sets the third bit of the GRE message header as a Key Present attribute according to protocol RFC2890, and an attribute value of the attribute may be selectively set by the user; when the user selects to fill 0 to the attribute value of the attribute, the Key Present is invalid, that is, keyword authentication is not required during decapsulation; when the user selects to fill 1 to the attribute value, the Key Present is valid, that is, keyword authentication is required during decapsulation, and the GRE message may be decapsulated only after the GRE message passes the keyword authentication; when the setting module 10 sets the fourth bit of the GRE message header as a Sequence Number Present attribute, an attribute value of the attribute may also be selectively set to be 0 or 1 by the user; when the attribute value of the fourth-bit attribute is 1, sequence number check is required to be performed on the GRE message during decapsulation, and the GRE message may be decapsulated only after the GRE message passes the sequence number check; when the attribute value of the fourth-bit attribute is 0, sequence number check is not required to be performed on the GRE message during decapsulation.

Optionally, the setting module 10 sets the fifth to thirteenth bits of the GRE message header as a Reserved0 attribute according to protocol RFC2784, and an attribute value of the attribute is set to be 1; when the setting module 10 sets the fourteenth to sixteenth bits of the GRE message header as a Version attribute, an attribute value of the attribute is set to be 0; and an encapsulation module 20, configured to perform GRE message encapsulation on the attribute-set GRE message header and the original message.

In the embodiment, the setting module 10 performs attribute setting on the first to sixteenth bits of the GRE message header according to the preset encapsulation rule, and the encapsulation module 20 takes the attribute-set GRE message header as the encapsulation format of the GRE message and performs GRE message encapsulation on the attribute-set GRE message header and the original message.

According to the embodiment of the present disclosure, attribute setting and encapsulation are performed on a GRE message header following different protocols according to a preset encapsulation rule, so that interconnection between network equipment following different protocols is ensured.

Figure 5:
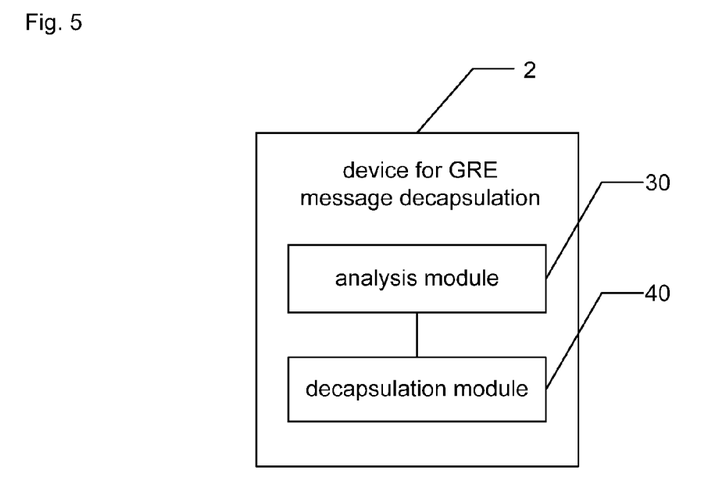
FIG. 5 is a structure diagram of a first embodiment of a device for GRE message decapsulation according to the present disclosure.

FIG. 5 is a structure diagram of a first embodiment of a device for GRE message decapsulation according to the present disclosure.

A device 2 for GRE message decapsulation provided by the embodiment includes:

an analysis module 30, configured to perform decapsulation analysis on predetermined bits of a header of a GRE message according to a preset decapsulation rule when the GRE message is received, wherein the GRE message includes an original data message and the header of the GRE message; during analysis, the analysis module 30 performs decapsulation analysis on first to sixteenth bits of the header of the GRE message according to the preset decapsulation rule;

specifically, when the analysis module 30 analyzes the first bit, the first bit of the GRE message header is set as a checksum attribute, and when an attribute value of the attribute is 0, the GRE message is directly decapsulated; when the attribute value of the attribute is 1, a checksum is calculated for the received GRE message, the calculated checksum is compared with an original checksum in the GRE message for checksum check, and if the calculated checksum is completely consistent with the original checksum in the GRE message, it is indicated that the GRE message passes the checksum check, and the GRE message is decapsulated; if the calculated checksum is inconsistent with the original checksum in the GRE message, it is indicated that the GRE message does not pass the checksum check, and the GRE message is required to be discarded;

when the analysis module 30 analyzes the second bit, the second bit of the GRE message header is set as a Reserved0 attribute, and when an attribute value of the attribute is 0, the GRE message is directly decapsulated; wherein if an RFC2784-based router is compatible with an RFC1701-based router and the RFC1701-based router analyzes the second bit, when the analysis module 30 determines that the attribute value of the bit is 0, the GRE message is directly decapsulated; when the attribute value of the bit is 1, the GRE message is directly decapsulated, and meanwhile, offset generated by the bit is required to be added when a calculation unit 32 calculates a length of the GRE message header;

optionally, when the analysis module 30 analyzes the third bit, the third bit of the GRE message header is set as a Key Present attribute, and when an attribute value of the attribute is 0, the GRE message is directly decapsulated; when the attribute value of the attribute is 1, keyword checking is performed, and only when keywords identified by a receiver of the router and a sender of the router are completely consistent, it is determined that the GRE message passes the check and the GRE message is decapsulated, otherwise the GRE message is discarded; when the analysis module 30 sets the fourth bit of the GRE message as a Sequence Number Present attribute for analysis, if an attribute value of the attribute is 0, the GRE message is directly decapsulated; when the attribute value of the attribute is 1, sequence number check is required, the GRE message is decapsulated only when the sequence number of the receiver of the router and the sequence number of the sender of the router are completely consistent, and the GRE message is discarded when the sequence number of the receiver of the router and the sequence number of the sender of the router are inconsistent; when the analysis module 30 sets the fifth to thirteenth bits of the GRE message header as a Reserved0 attribute, no matter whether an attribute value of the attribute is 0 or not 0, the fifth to thirteenth bits are ignored, and the GRE message is directly decapsulated; when the analysis module 30 sets the fourteenth to sixteenth bits of the GRE message header as a Version attribute, if an attribute value of the attribute is 0, the GRE message is directly decapsulated; when the attribute value of any one of the fourteenth to sixteenth bits of the GRE message header is not 0, the GRE message is discarded; and a decapsulation module 40, configured to perform decapsulation on the received GRE message to obtain an original message in the received GRE message according to an analysis result.

After the received GRE message header is analyzed, the decapsulation module 40 performs decapsulation on the received GRE message to obtain the original message in the received GRE message according to the analysis result. In the embodiment, the received GRE message is decapsulated according to the length of the GRE message header.

According to the embodiment of the present disclosure, decapsulation analysis is performed on the header of the GRE message to obtain the original message in the received GRE message according to the corresponding preset decapsulation rule, so that interconnection between network equipment following different protocols is ensured.

Figure 6:
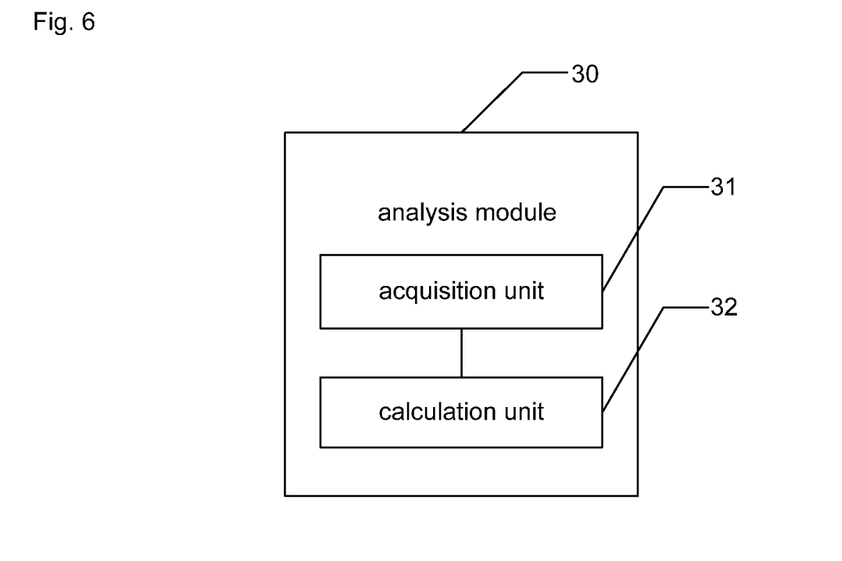
FIG. 6 is a structure diagram of an embodiment of an analysis module in a device for GRE message decapsulation according to the present disclosure.

FIG. 6 is a structure diagram of an embodiment of an analysis module in a device for GRE message decapsulation according to the present disclosure.

An embodiment of an analysis module in a device for GRE message decapsulation of the present disclosure is disclosed on the basis of the abovementioned embodiments. The analysis module 30 includes:

an acquisition unit 31, configured to acquire the offset corresponding to the predetermined bits when decapsulation analysis is performed on the predetermined bits of the header of the GRE message; and the calculation unit 32, configured to calculate the length of the GRE message header according to the offset.

Here, the offset refers to the bit amount of the bits in the GRE message header when the attribute values of the attributes of the bits are 1. The offset is described by taking analysis on the first bit as an example in the embodiment. For example, when the attribute value of the first bit is 1, checksum check is required, that is, totally 32 bits in a checksum (optional) part and an offset (optional) part appear in the GRE message header, and in addition, the 32 bits are required to be added when the length of the GRE message header is calculated.

After the bits of the whole GRE message header are analyzed, the acquisition unit 31 acquires the offset generated when the attribute value of each bit is 1, the calculation unit 32 calculates the length of the whole GRE message header according to the offset, and the original message in the received GRE message may be obtained by decapsulation more accurately according to the length of the GRE message header.

The embodiment of the present disclosure further provides a computer storage medium, in which computer-executable instructions are stored, the computer-executable instructions being configured to execute the method of any method embodiment.

Each module or unit may be implemented by a Central Processing unit (CPU), Digital Signal Processor (DSP) or Field-Programmable Gate Array (FPGA) in electronic equipment.

Those skilled in the art should understand that the embodiments of the present disclosure may be provided as a method, a system or a computer program product. Therefore, the present disclosure may adopt a form of hardware embodiment, software embodiment and combined software and hardware embodiment. Moreover, the present disclosure may adopt a form of computer program product implemented on one or more computer-available storage media (including, but not limited to, a disk memory and an optical memory) including computer-available program codes.

The present disclosure is described with reference to flowcharts and/or block diagrams of the method, equipment (system) and computer program product according to the embodiments of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one or more flows in the flowcharts and/or one or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above are only the preferred embodiments of the present disclosure and not thus intended to limit the scope of the present disclosure, and equivalent structure or equivalent flow transformations made by virtue of the contents of the specification and drawings of the present disclosure or direct or indirect application of the contents of the specification and drawings of the present disclosure to other related arts shall fall within the scope of protection of the present disclosure.

What is claimed is:

1. A method for Generic Routing Encapsulation (GRE) message decapsulation, comprising:
    performing decapsulation analysis on predetermined bits of a header of a GRE message according to a preset decapsulation rule when the GRE message is received; and
    performing decapsulation on the received GRE message to obtain an original message in the received GRE message according to an analysis result;
    wherein the predetermined bits comprise first to sixteenth bits of the header of the GRE message, and the preset decapsulation rule comprises:
    directly performing decapsulation when the first bit of the header of the GRE message is 0;
    performing checksum check when the first bit of the header of the GRE message is 1, and directly performing decapsulation when the GRE message passes the checksum check, otherwise, discarding the GRE message when the GRE message does not pass the checksum check;
    directly performing decapsulation when the second bit of the header of the GRE message is 0;
    directly performing decapsulation when the third bit of the header of the GRE message is 0;
    performing keyword checking when the third bit of the header of the GRE message is 1, and judging whether to directly perform decapsulation or not according to a checking result;
    directly performing decapsulation when the fourth bit of the header of the GRE message is 0;
    performing sequence number check when the fourth bit of the header of the GRE message is 1, and judging whether to directly perform decapsulation or not according to a check result;
    ignoring the fifth to thirteenth bits of the header of the GRE message, and directly performing decapsulation;
    directly performing decapsulation when the fourteenth to sixteenth bits of the header of the GRE message are 0; and
    discarding the GRE message when any one of the fourteenth to sixteenth bits of the header of the GRE message is not 0.

2. The method according to claim 1, before the step of performing decapsulation on the received GRE message to obtain the original message in the received GRE message according to the analysis result, the method further comprising:
    acquiring offset corresponding to the predetermined bits when the decapsulation analysis is performed on the predetermined bits of the header of the GRE message; and
    calculating a length of the header of the GRE message according to the offset.

3. A device for Generic Routing Encapsulation (GRE) message decapsulation, comprising a processor and a memory storing program instructions, which, when executed by the processor, cause the processor to perform steps comprising:
    performing decapsulation analysis on predetermined bits of a header of a GRE message according to a preset decapsulation rule when the GRE message is received; and
    performing decapsulation on the received GRE message to obtain an original message in the received GRE message according to an analysis result;
    wherein the predetermined bits comprise first to sixteenth bits of the header of the GRE message, and the preset decapsulation rule comprises:
    directly performing decapsulation when the first bit of the header of the GRE message is 0;
    performing checksum check when the first bit of the header of the GRE message is 1, and directly performing decapsulation when the GRE message passes the checksum check, otherwise, discarding the GRE message when the GRE message does not pass the checksum check;
    directly performing decapsulation when the second bit of the header of the GRE message is 0;
    directly performing decapsulation when the third bit of the header of the GRE message is 0;
    performing keyword checking when the third bit of the header of the GRE message is 1, and judging whether to directly perform decapsulation or not according to a checking result;
    directly performing decapsulation when the fourth bit of the header of the GRE message is 0;
    performing sequence number check when the fourth bit of the header of the GRE message is 1, and judging whether to directly perform decapsulation or not according to a check result;
    ignoring the fifth to thirteenth bits of the header of the GRE message, and directly performing decapsulation;
    directly performing decapsulation when the fourteenth to sixteenth bits of the header of the GRE message are 0; and
    discarding the GRE message when any one of the fourteenth to sixteenth bits of the header of the GRE message is not 0.

4. The device according to claim 3, wherein the processor is further configured to be capable of executing the stored program instructions to:
    acquire offset corresponding to the predetermined bits when the decapsulation analysis is performed on the predetermined bits of the header of the GRE message; and
    calculate a length of the header of the GRE message according to the offset.

5. A non-transitory computer storage medium, in which computer-executable instructions are stored, the computer-executable instructions being configured to execute a method according to claim 1.

6. A non-transitory computer storage medium, in which computer-executable instructions are stored, the computer-executable instructions being configured to execute a method according to claim 2.

* * * * *